United States Patent Office 2,700,667
Patented Jan. 25, 1955

2,700,667

8-(2-BENZYL-4-CHLOROPHENOXY)CAFFEINE

Douglas E. Cooper, Syracuse, and Lee C. Cheney, Fayetteville, N. Y., assignors to Bristol Laboratories Inc., Syracuse, N. Y., a corporation of New York No Drawing. Application January 3, 1952,
Serial No. 264,843

1 Claim. (Cl. 260—256)

This invention relates to ethers derived from caffeine, and more particularly to mixed ethers of 8-hydroxycaffeine and certain phenols.

A considerable number of ethers of caffeine are known. Although some of these are aryl ethers, a rather greater proportion are alkyl ethers. One of the latter, 8-ethoxycaffeine, is a more active stimulant than caffeine and has been employed to some extent in practical therapeutics. So far as is known none of the known aryl ethers, all of which are derived from monocyclicphenols, have shown pharmaceutic merit.

We have now discovered a class of caffeine ethers derived from phenols containing two rings, particularly from benzylphenol and the substituted ortho-benzylphenols, which ethers have valuable therapeutic properties. These derivatives may be prepared by reacting 8-chlorocaffeine or 8-bromocaffeine with the sodium or other alkali metal derivative of the appropriate benzylphenol. It is usually advantageous to conduct the reaction in an inert solvent, e. g. toluene or xylene, and to employ moderately elevated temperatures, e. g. 100° C. The benzylphenols employed in preparing the ethers of this invention have the general formula

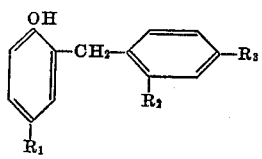

in which $R_1$, $R_2$, and $R_3$ belong to the class consisting of hydrogen, halogen, alkyl, and alkoxy. Examples of these phenols are:

2-benzylphenol
2-benzyl-4-chlorophenol
2-benzyl-4-methoxyphenol
2-benzyl-4-methylphenol
2-benzyl-4-isopropylphenol
2-(2',4'-dichlorobenzyl)phenol
2-(2'-chloro-4'-methylbenzyl)phenol
2-(2'-methoxybenzyl)phenol
2-(4'-bromobenzyl)phenol For a typical example of the method by which the compounds of this invention are produced, we describe in detail the method used for preparing 8-(2-benzyl-4-chlorophenoxy)caffeine, having the following structure

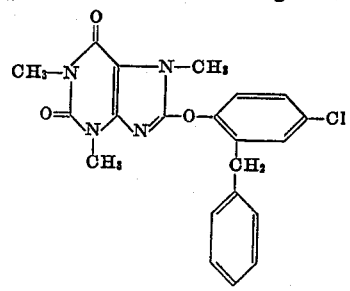

using 2-benzyl-4-chlorophenol and 8-chlorocaffeine.

Example

The sodium derivative of 2-benzyl-4-chlorophenol was prepared by refluxing a xylene (120 ml.) solution of the phenol (21.8 grams) with 4.5 grams (excess) of flaked sodium hydroxide under a water-collecting (Dean-Stark) trap. Activated carbon (1 gram) was added to remove traces of colored impurities present in the commercial grade of phenol derivatives employed. After 12 hours the hot solution was filtered and then refluxed 12 hours longer with 15 grams 8-chlorocaffeine. The resulting solution was cooled to room temperature, filtered from sodium chloride, and then diluted with 960 ml. methanol and 120 ml. water. Upon standing in the refrigerator three days the clear solution deposited large colorless rhombic plates, 10.1 grams, melting at 160° C.

Analysis:
Calculated for $C_{21}H_{19}O_3N_4Cl$:
C, 61.4%
H, 4.66%
N, 13.6%
Found:
C, 61.8%
H, 4.82%
N, 13.3%

Many modifications of the foregoing successful procedure will be readily apparent to those skilled in the art, and the applicant's invention is not limited in any way by the procedure described herein.

We claim:

The compound 8-(2-benzyl-4-chlorophenoxy)caffeine.

No references cited.